(12) United States Patent
VanZant

(10) Patent No.: US 10,531,649 B2
(45) Date of Patent: Jan. 14, 2020

(54) SPINNERBAIT FISHING LURE

(71) Applicant: Joseph LeeRoy VanZant, Columbia Falls, MT (US)

(72) Inventor: Joseph LeeRoy VanZant, Columbia Falls, MT (US)

(73) Assignee: Kick Bass Jigs LLC, Columbia Falls, MT (US)

( * ) Notice: Subject to any disclaimer, the term of this patent is extended or adjusted under 35 U.S.C. 154(b) by 0 days.

(21) Appl. No.: 15/830,576

(22) Filed: Dec. 4, 2017

(65) Prior Publication Data

US 2019/0166813 A1 Jun. 6, 2019

(51) Int. Cl.
*A01K 85/10* (2006.01)

(52) U.S. Cl.
CPC .................. *A01K 85/10* (2013.01)

(58) Field of Classification Search
CPC ......... A01K 85/00; A01K 85/10; A01K 85/16
See application file for complete search history.

(56) References Cited

U.S. PATENT DOCUMENTS

| | | | | |
|---|---|---|---|---|
| 1,547,619 A | * | 7/1925 | Shannon | A01K 85/00 43/42.24 |
| 1,734,883 A | | 11/1929 | Shannon | |
| 1,787,726 A | * | 1/1931 | Heddon | A01K 85/00 43/42.13 |
| 1,923,840 A | * | 8/1933 | Ozburn | A01K 85/16 43/42.13 |
| 2,125,030 A | * | 7/1938 | Ozburn | A01K 85/16 43/42.13 |
| 2,167,945 A | * | 8/1939 | Gilliam | A01K 85/16 43/42.13 |
| 2,471,499 A | * | 5/1949 | Shipman | A01K 85/00 43/42.13 |
| D185,865 S | | 8/1959 | Herman | |
| 3,253,363 A | | 5/1966 | Steehn | |
| 3,257,750 A | | 6/1966 | Shannon | |
| 3,747,256 A | * | 7/1973 | Haddock | A01K 85/00 43/42.13 |
| 4,012,862 A | | 3/1977 | Dubois | |
| D258,378 S | | 2/1981 | Hervin | |
| 4,671,007 A | * | 6/1987 | Stanczyk | A01K 85/00 140/102 |
| 4,884,358 A | | 12/1989 | Grove et al. | |
| 5,138,789 A | | 8/1992 | Hood | |
| D364,444 S | | 11/1995 | DeCosta | |

(Continued)

*Primary Examiner* — Richard G Davis
(74) *Attorney, Agent, or Firm* — Antoinette M. Tease

(57) ABSTRACT

A spinnerbait fishing lure having an ellipsoidal weighted body with a molded-in hook, transverse spinner assembly, and V-shaped vertical spinner assembly. The eye of the hook protrudes from the top front part of the body. The longitudinal axis of the body is perpendicular to the shank of the hook. The transverse spinner assembly has a horizontal crossbar that passes through and is rigidly attached to the eye and that is oriented perpendicular to a plane formed by the bend of the hook. First and second side spinner blades are connected to the crossbar to form rotatable connections between the blades and the crossbar. The V-shaped vertical spinner assembly has a lower leg that is molded into and extends from the front of the body, an upper leg, and an attachment loop that is formed into a vertex of a V-shaped bend between the lower leg and the upper leg.

10 Claims, 4 Drawing Sheets

(56) References Cited

U.S. PATENT DOCUMENTS

| | | | | |
|---|---|---|---|---|
| 5,911,570 A * | 6/1999 | Freitas | ................... | A01K 85/00 43/42.13 |
| 6,122,855 A * | 9/2000 | Heuke | ................... | A01K 85/00 43/42.09 |
| D471,951 S | 3/2003 | Bowman | | |
| 6,748,692 B2 | 6/2004 | Sprouse | | |
| 6,880,287 B2 | 4/2005 | Eubanks | | |
| 7,010,881 B2 | 3/2006 | Altman | | |
| 7,360,335 B2 | 4/2008 | Edwards | | |
| 7,467,491 B1 | 12/2008 | Slocum | | |
| 2003/0074828 A1 | 4/2003 | Sprouse | | |
| 2004/0221502 A1 | 11/2004 | Eubanks | | |
| 2005/0229473 A1 | 10/2005 | Altman | | |
| 2007/0277423 A1* | 12/2007 | Edwards | ................. | A01K 85/00 43/42.13 |
| 2017/0042134 A1* | 2/2017 | Sandefur | ................ | A01K 85/10 |

\* cited by examiner

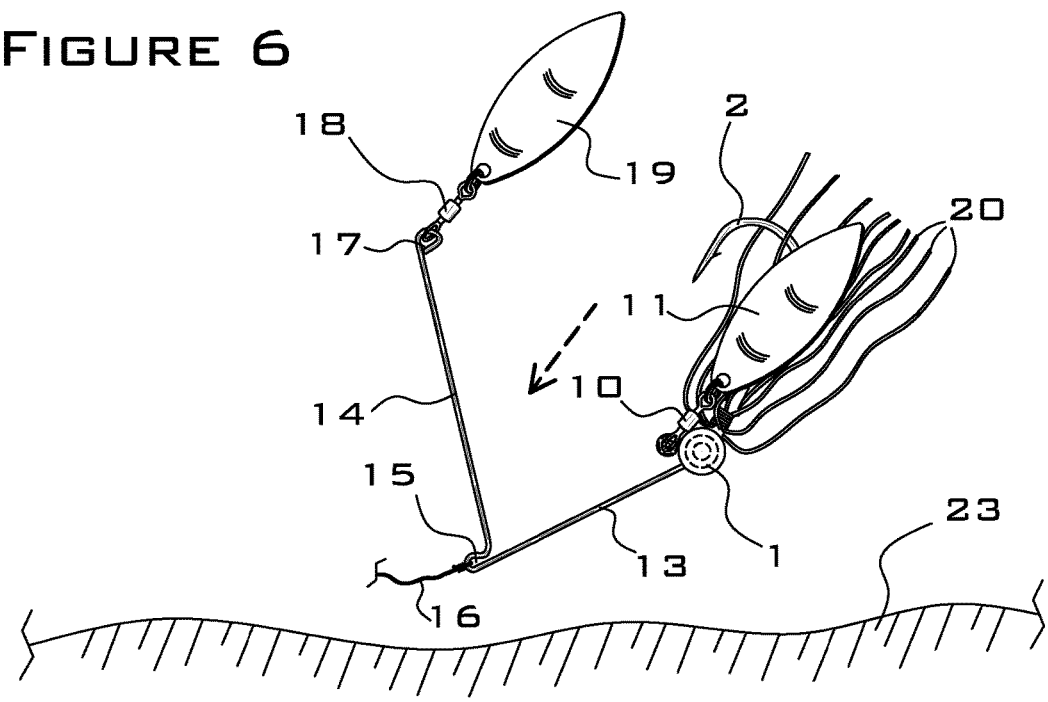
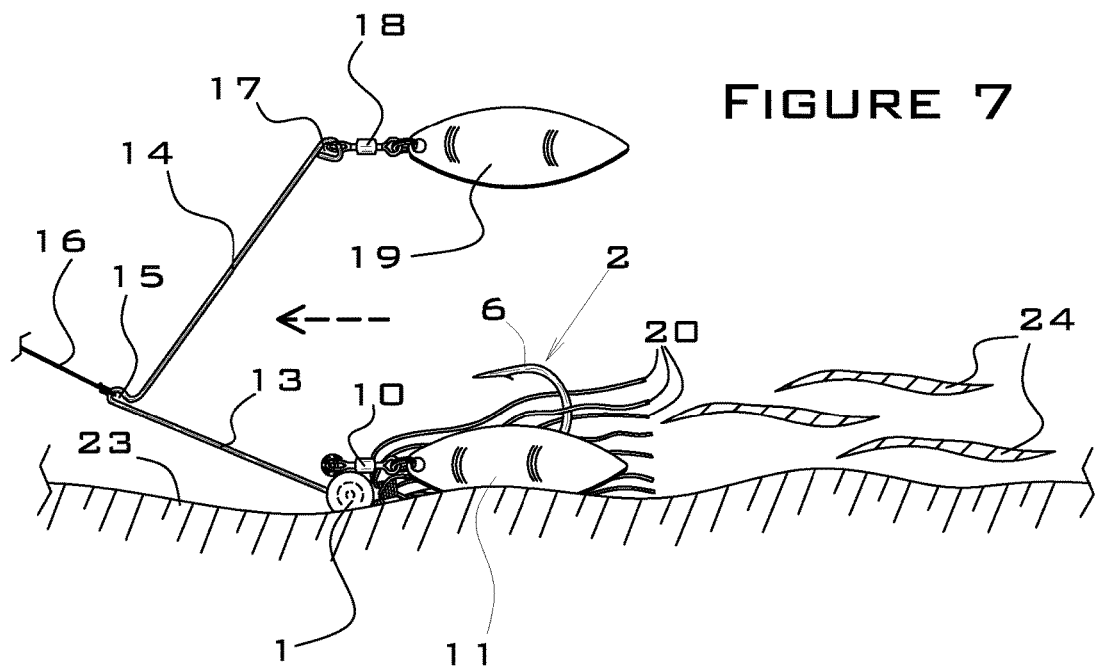

SPINNERBAIT FISHING LURE

BACKGROUND OF THE INVENTION

1. Field of the Invention

The present invention relates to the field of spinnerbait fishing lures, and more particularly, to a spinnerbait lure that is designed to optimize its effectiveness while being pulled through open water, when free-falling through open water, or while being pulled along the bottom of a water body.

2. Description of the Related Art

Spinnerbait fishing lures are well known as effective fish-catching devices, and they are manufactured in a multitude of shapes, sizes and configurations. According to Wikipedia (Nov. 15, 2017), "a spinnerbait refers to any one of a family of fishing lures that get their name from one or more metal blades shaped so as to spin like a propeller when the lure is in motion, creating varying degrees of flash and vibration that mimics small fish or other prey. The two most popular types of spinnerbaits are the 'in-line spinner' and 'safety pin' spinnerbaits, though others such as the 'tail-spinner' also exist. Spinnerbaits are used principally for catching predatory fish such as perch, pike and bass."

Most spinnerbait lures are designed to attract fish and entice them to strike when the lure is being pulled through the water by a fisherman using a rod and reel, with the reel being rotated by the fisherman's hand to wind in a fishing line that is connected to the lure. The present invention is a single hook, three-bladed spinnerbait that is likewise designed to attract fish while being retrieved in this conventional manner by a fisherman, but, in addition, the present invention is designed to generate motions that produce fish strikes when it is free-falling through the water column with a slack fishing line and also when it is in contact with a lake bottom and being pulled across the lake bottom. When in the free-falling mode, the present invention does not drop vertically as other lures do but instead travels in a diagonal forward direction while dropping downward, with the spinner blades turning effectively and with the hook in an optimal upright position for hooking any fish that strikes.

The ability of the present invention to move diagonally in an upright and stable orientation as is drops through the water is due to combination of body weight, body shape and spinner blade configuration. The ability of the present invention to attract and hook fish as it is being pulled across a lake bottom is primarily due to the football shape of the weighted body and the positions of the two side spinner blades that act as lateral supports or "outriggers" to keep the hook pointed upright and above the lake bottom sediments. Although there are a number of single-hook, multi-bladed spinnerbait lures that are the subject of U.S. patents and patent applications, none of these examples is constructed similarly to the present invention, and, as a result, none of these examples is able to work effectively under all three modes of lure movement as discussed above.

U.S. Pat. No. 1,734,883 (Shannon, 1927) discloses a spinnerbait lure that comprises two spinner blades that are connected to the shank of a hook. In this invention, the fishing line is connected to the eye of the hook.

U.S. Pat. No. 2,471,499 (Shipman, 1946) discloses a spinnerbait lure that comprises an eyeless hook that is attached by a ferrule to a separate stem piece, which comprises an attachment eye. Two spinner blades are connected to the stem piece with flexible leaders that pass through the eye of the stem piece. The fishing line is also attached to the eye of the stem piece.

U.S. Pat. No. D185,865 (Herman, 1959) discloses a spinnerbait lure that comprises an elongated body having a distinctive shape, with a hook that extends from the rear of the body and the long axis of the body parallel with the hook shank, and with a fishing line attachment loop that extends from the front of the body. The lure further comprises a pair of spinner assemblies, with each assembly comprising a wire with a spinner blade rotatably attached to the terminal end. The spinner assembly wires exit from the left and right sides of the body near the front end and extend outward and rearward so that one spinner blade is positioned on each side of the hook when the lure is being pulled through the water.

U.S. Pat. No. 3,253,363 (Steehn, 1964) discloses a snag-resistant spinnerbait lure comprising a weight with a hook protruding from the rear end of the weight and an eye protruding from the top of the weight. The eye of the weight is not part of the hook. One end of a rod-like support wire is rotatably attached to the eye of the weight, and the other end of the support wire is attached to a single spinner blade. The fishing line is attached to a loop that is formed in the central portion of the support wire. In an alternate embodiment, the single spinner blade is replaced by a pair of spinner blades that are attached to the support wire by a pair of wire support legs. In this second embodiment, the fishing line and the pair of support legs are attached to a support wire loop that is formed into one end of the support wire.

U.S. Pat. No. 3,257,750 (Shannon, 1966) discloses a spinnerbait lure that comprises two specially shaped spinner blades that are designed to attract fish by sound waves and erratic fluttering action. The lure comprises a hook with an eye. The spinner blades are attached to the lure via a bifurcated resilient wire carrier, which is attached to the eye of the hook. The fishing line is also attached to the eye of the hook.

U.S. Pat. No. 3,747,256 (Haddock, 1973) discloses a spinnerbait lure that comprises an eyed hook that is embedded within a cylindrical or barrel-shaped weight, with the eye of the hook protruding through the top of the weight and positioned rearward of the centerline of the weight (in contrast to the present invention, in which the hook eye protrudes from the forward portion of the weighted head). A wire link passes through the eye of the hook. The invention further comprises a pair of spinner blades that are connected to the two terminal ends of a V-shaped steel wire connector assembly. The center of the steel wire assembly passes through the wire link so as to form a connection between the connector assembly and the eye of the hook that allows the hook and head to swivel and pivot relative to the wire link and steel wire assembly. The invention does not comprise a third (center) spinner blade.

U.S. Pat. No. 4,012,862 (Dubois, 1977) discloses a spinnerbait lure that comprises an eyed hook that is molded into a lead body. In a first embodiment, the invention comprises a pair of spinner blades that are attached to the two terminal ends of a single piece of wire. The center of the wire is bent to form a loop, and the wire is connected to the lure by looping it through the eye of the hook and through the loop of the wire, thereby forming a pivotable connection between the wire and the hook. The fishing line is connected to a loop in the center of the wire. The invention is designed to travel through the water in a hook-down orientation, with the spinner blade assembly hanging down below the hook and thereby preventing the hook from getting caught on submerged objects.

U.S. Pat. No. D258,378 (Hervin, 1981) discloses an ornamental design for a fishing lure comprising a pair of symmetrically positioned spinner blades that are attached to a central object by wires extending laterally from the object. The design includes an openable attachment loop for attaching a hook and a permanently closed loop for attaching a fishing line.

U.S. Pat. No. 4,884,358 (Grove et al., 1989) discloses a spinnerbait lure that comprises a weighted head with a hook that is pivotably attached to the rear of the head, a first wire that extends horizontally from the front of the head, and second and third wires that extend orthogonally outward and upward from the left and right sides of the head, respectively. The first wire comprises a loop in its central portion for attachment of the fishing line and is attached to a first spinner blade at its terminal end. The second and third wires are attached to second and third spinner blades, respectively, at their terminal ends. The first spinner blade is larger than the second and third spinner blades, which are of equal size. When the lure is being pulled through the water on a normal retrieve, the first spinner blade is positioned above and vertically in line with the head of the lure, while the second and third spinner blades are above and laterally offset from the shank of the hook.

U.S. Pat. No. 5,138,789 (Hood, 1992) discloses a spinnerbait lure comprising a lead weight with a hook that extends from the rear end of the weight and a pair of wires protruding in a generally horizontal orientation from the front end of the weight. The protruding ends of the wires are bent so as to form laterally extending crosswire legs that have a spinner blade attached to the terminal end of each wire. A third spinner blade is attached to the pair of wires by a first ring terminal attached to the rear of the third blade, and the fishing line is attached to the lure by a second ring terminal that is attached to the front of the third spinner blade. As shown in FIGS. 8 through 13, the three spinner blades are positioned generally in the same horizontal plane when the lure is being pulled though the water, and all three of the spinner blades are positioned in front of the hook.

U.S. Pat. No. D364,444 (DeCosta, 1995) discloses an ornamental design for a fishing lure that comprises a central, cone-shaped weighted body, with four wires protruding radially from the weighted body, and with each wire having a spinner blade rotatably attached to its terminal end.

U.S. Pat. No. 5,911,570 (Freitas et al., 1999) discloses a floating fishing lure comprised of two treble hooks mounted on the body of the lure and a pair of spinners that are mounted on a yoke extending laterally outward on each side of the body. The center point of the yoke is mounted onto a shaft that extends horizontally from the front of the body. The fishing line is attached to an eye on the terminal end of the shaft.

U.S. Pat. No. D471,951 (Bowman, 2003) discloses an ornamental design for a spinnerbait lure that comprises a weighted body with dual spinner arms protruding from the front end of the weighted body. Each spinner arm comprises a wire with a first spinner rotatably attached to its terminal end and a second spinner slidably and rotatably attached around the wire a short distance back from the terminal end. Each of the spinner arms comprises a bend in its medial portion that form an attachment point for a fishing line.

U.S. Pat. No. 6,748,692 (Sprouse, 2004) discloses a spinnerbait lure comprising a weighted head with a hook that extends from the rear end of the head and a horizontal hole or eyelet in the front of the head for attachment of the fishing line. The invention further comprises a pair of wire legs that extend from the front of the body and laterally outward on each side of the body. Each wire leg is terminated with a spinner blade. The wire legs extend rearward to the pointed end of the hook and are positioned on each side of the hook, thereby preventing the hook from striking and snagging submerged objects as the lure is pulled through the water. Unlike the present invention, the side spinners of this invention are not designed for dragging along a lake bottom in order to stir up mud for the purpose of stabilizing the hook or attracting fish. Furthermore, the lure does not comprise a third (center) spinner blade.

U.S. Pat. No. 6,880,287 (Eubanks, 2005) discloses a noise-producing spinnerbait lure that comprises a weighted body with a trailing hook that extends from the rear of the weighted body. The invention further comprises a pair of spinner blade supporting wires that extend horizontally from the front of the weighted body. The spinner blade supporting wires are bent backward and apart so that they extend above and on each side of the hook. A spinner blade is attached to the terminal end of each spinner blade supporting wire, and the wires are bent apart so that the two spinner blades contact each other as they rotate, when the lure is pulled through the water. The contact between the two rotating spinner blades produces clicking noises that attract fish. A fishing line is connected to the lure at a loop that is manufactured into the medial portion of the spinner blade supporting wires.

U.S. Pat. No. 7,010,881 (Altman, 2006) discloses a fishing lure comprising a molded, weighted body with a hook that extends from the rear of the body. The invention further comprises a wire shank that extends horizontally from the front of the body and is bent upward to support a first spinner blade and a loop for attaching a fishing line. The invention also comprises two rearwardly angled crimped sleeves, with one sleeve protruding from each side of the body. A wire arm is crimped into each of the sleeves, with each wire arm extending outward from the body, and a side spinner blade is attached to the terminal end of each of the wire arm. As shown in FIG. 1, the invention is designed to be pulled through the water in a hook-down orientation, with all three of the spinner blades located vertically below the body, the first spinner blade positioned horizontally in front of the body, and the two side spinner blades located horizontally approximately even with the hook.

U.S. Pat. No. 7,360,335 (Edwards, 2008) discloses a spinnerbait lure that comprises a weighted body with a hook that extends from the rear of the body. The rear of the body is molded in the shape of a stem to which a harness assembly may be removably attached via a circular elastomeric ring that fits around the stem. The harness comprises two flexible wire arms, and the terminal end of each wire arm is connected to a side spinner blade. The harness may be exchanged for other harnesses having different sizes and colors of spinner blades. A wire assembly extends horizontally from the front of the body and is bent upwards and backwards in the central portion. A top spinner blade assembly, comprised of a front buzz blade and a rear spinner blade, is connected to the terminal end of the wire assembly. A fishing line is attached to a loop formed in the central portion of the wire assembly.

U.S. Pat. No. 7,467,491 (Slocum, 2008) discloses a spinnerbait lure comprised of a weighted body having a hook that extends from the rear end and a wire assembly (referred to as an elongated shank) that extends from the front end. The elongated shank comprises a wire with a bend in the medial portion of the wire that produces a first leg and a second leg, with the terminal end of the first leg being distal from the weighted body and the terminal end of the second leg being the wire end that extends from the front of the weighted body. A loop is formed in the wire at the bend, and this loop is used to attach a fishing line. A first spinner blade is rotatably attached to a loop that is formed at the terminal end of the first leg of the elongated shank, and a second spinner blade is rotatably attached to the central portion of the second leg of the elongated shank. In one embodiment, an additional third spinner blade is rotatably and slidably attached to the central portion of the first leg. The lure is designed to "be in a state of perpetual imbalance, generating dynamic and erratic motion" [col 4, lines 50-51] when it is pulled through the water.

U.S. Patent Application. Pub. No. 2017/0042134 (Sandefur) discloses a spinnerbait lure comprising a weighted body with a plurality of transverse wires extending radially from the front portion of the weighted body. A rotatable spinner blade is attached to each end of each transverse wire. The preferred method of attachment of the transverse wires to the weighted body is not described, although an optional spindle attachment is described as follows: "It is also contemplated that the transverse wires or whiskers could rotate around a spindle like a propeller" [0031, lines 7-9]. Note that a plurality of transverse wires would result in a minimum of two wires, each having two spinner blades, for a minimum of four spinner blades on the transverse wires, in contrast to the present invention, which has two side spinner blades. Unlike the present invention, none of the wires extends horizontally from the body.

The Sandefur invention also comprises a vertically oriented, V-shaped wire assembly having a lower leg that extends from the lure body at a "selected obtuse" (but unspecified) angle [0009, line 5]. The wire assembly comprises a fishing line attachment loop at the vertex of the V. The distal end of the upper leg of the wire assembly is attached to a rotatable hook or spinner blade. The hook or spinner blade is positioned over the lure body when the lure is pulled through the water. In a second embodiment, a second spinner blade is rotatably and slidably attached to the medial portion of the upper leg of the wire assembly. The shape of the lure body in the preferred embodiment is described as "approximately tear drop shaped[,]" which "tapers to a point at the rear" [0028, line 5-7].

BRIEF SUMMARY OF THE INVENTION

The present invention is a spinnerbait fishing lure comprising: an ellipsoidal weighted body having a molded-in hook, wherein the hook comprises an eye that protrudes from a top front part of the weighted body, a shank that extends from a rear of the weighted body, a bend, and a point, and wherein a longitudinal axis of the weighted body is perpendicular to the shank; a transverse spinner assembly comprising a horizontal crossbar with a first end, a second end, and a midpoint that passes through and is rigidly attached to the eye, wherein the crossbar is oriented perpendicular to a plane formed by the bend of the hook, wherein a first swivel is connected to the first end of the crossbar, wherein a second swivel is connected to the second end of the crossbar, wherein a first side spinner blade is connected to the first swivel to form a rotatable connection between the first side spinner blade and the first end of the crossbar, and wherein a second side spinner blade is connected to the second swivel to form a rotatable connection between the second side spinner blade and the second end of the crossbar; and a V-shaped vertical spinner assembly comprising a lower leg that is molded into and extends from a front of the weighted body, an upper leg, and an attachment loop that is formed into a vertex of a V-shaped bend between the lower leg and the upper leg, wherein the lower and upper legs form a plane, and wherein the crossbar is oriented perpendicular to the plane formed by the lower and upper legs of the vertical spinner assembly.

In a preferred embodiment, the crossbar has a first end and a second end, and the first and second ends of the crossbar each comprises a loop connector that is formed by bending the end of the crossbar. Preferably, a plane formed by the lower leg and the upper leg is coplanar with a plane formed by the bend of the hook.

In a preferred embodiment, an upper end of the upper leg terminates in a loop connector that is formed by bending an end of the upper leg, a third swivel is attached to the loop connector, and a central spinner blade is attached to the swivel to form a rotatable connection between the upper leg and the central spinner blade. Preferably, the central spinner blade is positioned vertically in line with the weighted body and the hook.

In a preferred embodiment, the longitudinal axis of the weighted body is perpendicular to the plane formed by the lower and upper legs of the vertical spinner assembly and parallel to a longitudinal axis of the crossbar. Preferably, the first and second side spinner blades are positioned vertically lower than the hook.

In a preferred embodiment, the crossbar has a first length, the lower leg has a second length, and the upper leg has a third length, the ratio of the second length to the first length is in the range of 0.4 to 0.5, and the ratio of the third length to the second length is in the range of 1.4 to 1.5. Preferably, there is a first vertical angle between the hook shank and the lower leg, there is a second vertical angle between the lower leg and the upper leg, there is an angle between the hook eye and the hook shank, the first vertical angle is preferably in the range of 30 to 34 degrees, the second vertical angle is preferably in the range of 75 to 79 degrees, and the angle between the hook eye and the hook shank is in the range of 65 to 69 degrees.

Optionally, the invention further comprises a plurality of flexible rubber strands that are attached to a forward portion of the hook shank to form a skirt around the hook.

BRIEF DESCRIPTION OF THE DRAWINGS

FIG. 6 is a left side view of the present invention shown free-falling through open water above a lake bottom.

FIG. 7 is a left side view of the present invention shown being pulled across a lake bottom.

REFERENCE NUMBERS

Figure 1:
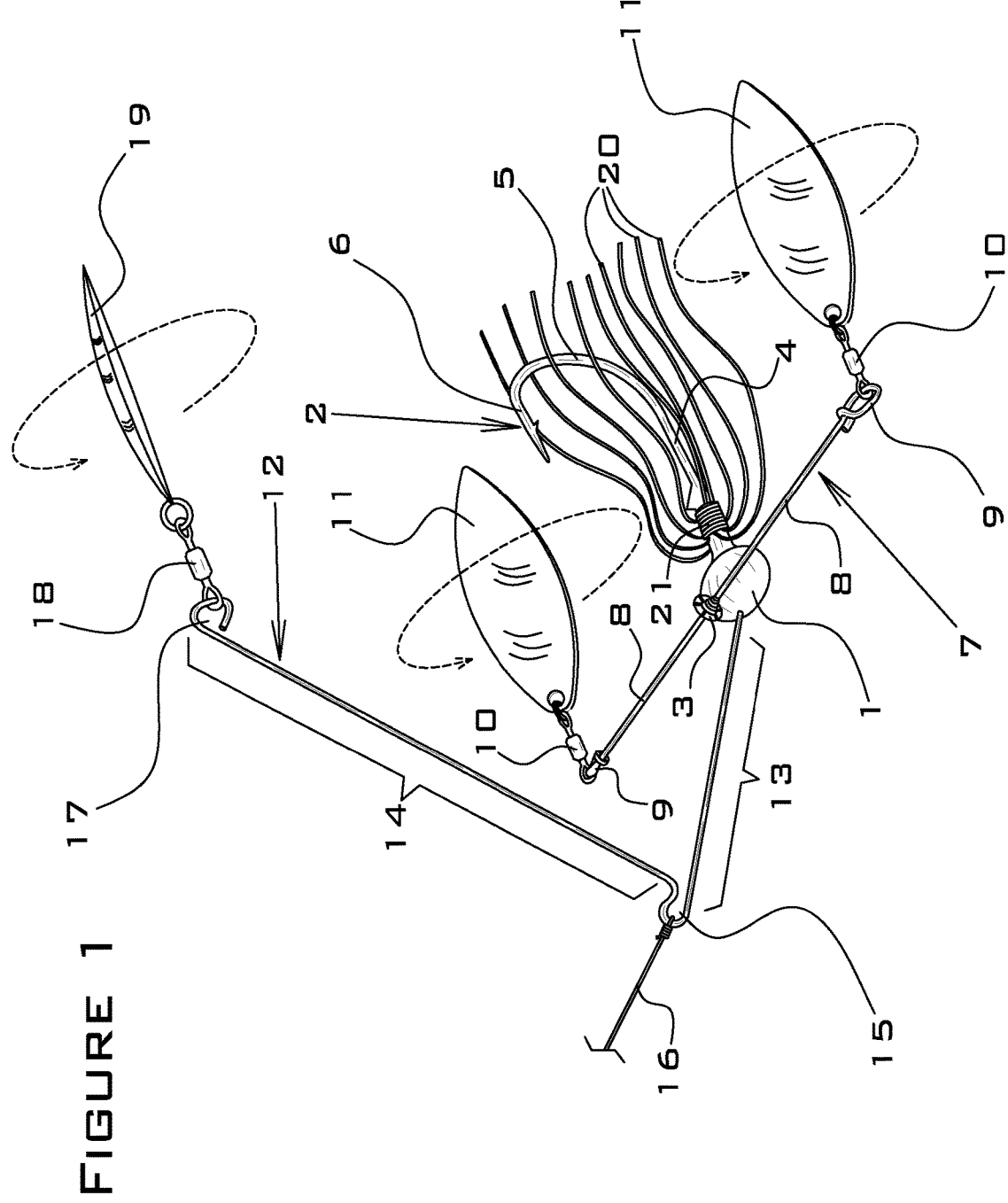
FIG. 1 is a perspective view of the present invention shown in an orientation that is produced when the present invention is being pulled through the water during a normal retrieve.

1 Weighted body
2 Hook
3 Eye of hook
4 Shank of hook
5 Bend of hook
6 Point of hook
7 Transverse spinner assembly
8 Crossbar
9 Loop connector of crossbar
10 Swivel of transverse spinner assembly
11 Side spinner blade
12 Vertical spinner assembly
13 Lower leg
14 Upper leg
15 Fishing line attachment loop
16 Fishing line
17 Loop connector of vertical spinner assembly
18 Swivel of the vertical spinner assembly
19 Central spinner blade
20 Rubber strands
21 Wrapping thread
22 Skirt-retaining extension
23 Lake bottom
24 Mud trail

DETAILED DESCRIPTION OF INVENTION

FIG. 1 is a perspective view of the present invention shown in an orientation that is produced when the present invention is being pulled through the water during a normal retrieve. The present invention comprises an ellipsoidal or football-shaped weighted body 1 with a molded-in hook 2, in which the hook 2 comprises an eye 3 that protrudes from the top front part of the weighted body 1, a shank 4 that extends from the rear of the weighted body 1, a bend 5, and a point 6. The longitudinal axis of the weighted body 1 is oriented perpendicular to the shank 4 and is also oriented perpendicular to the direction of movement of the present invention when it is pulled through the water. The present invention comprises a transverse spinner assembly 7, which comprises a horizontal crossbar 8 whose midpoint passes through and is rigidly attached to the eye 3 so that the crossbar 8 is oriented perpendicular to the plane formed by the bend 5 of the hook. The crossbar 8 has a loop connector 9 at each end that is formed by bending the ends of the crossbar. The proximal end of a swivel 10 is connected to each loop connector 9, and a side spinner blade 11 is connected to each distal end of each swivel 10, thereby forming a rotatable connection between the crossbar 8 and each side spinner blade 11, as illustrated by the dashed arrows around the two side spinner blades 11.

The present invention comprises a V-shaped vertical spinner assembly 12, which comprises a lower leg 13 that is molded into and extends from the front of the weighted body 1, an upper leg 14, and an attachment loop 15 that is formed into the vertex of the V-shaped bend between the lower leg 13 and the upper leg 14. The attachment loop 15 provides an attachment point for a fishing line 16. The plane formed by the lower leg 13 and the upper leg 14 is coplanar with the plane formed by the bend 5 of the hook 2. The upper end of the upper leg 14 is terminated in a loop connector 17 that is formed by bending the end of the upper leg 14 into a roughly circular shape, and the proximal end of a swivel 18 is attached to the loop connector 17. A single central spinner blade 19 is attached to the distal end of the swivel 18, thereby forming a rotatable connection between the upper leg 14 and the central spinner blade 19, as illustrated by the dashed arrow around the central spinner blade 19. A plurality of flexible rubber strands 20 (commonly referred to collectively as a "skirt") are attached to the forward portion of the hook shank 4 by wrapping with thread 21. The purpose of the rubber strands 20 is to camouflage the hook 2 from interested fish and to add lifelike movement to the present invention when it moves through the water.

The weighted body 1 is preferably formed by pouring molten lead into a mold, wherein the hook 2 and the proximal end of the lower leg 13 have been inserted into the mold at precise, predetermined positions and orientations prior to pouring the molten lead. The crossbar 8, the lower leg 13, and the upper leg 14 are preferably manufactured from stainless steel wire. The two side spinner blades 11 are preferably identical in order to provide lateral balance to the lure. These blades may be any of a variety of conventionally shaped blades, including the so-called Colorado and Willow Leaf patterns, and may be made in any color and from a variety of materials including stainless steel, plated steel and brass. The central spinner blade 17 may the identical to the two side spinner blades, or it may be of a different size and material, and may be made in any color and from a variety of materials including stainless steel, plated steel and brass. The crossbar 8 is preferably rigidly attached to the hook eye 3 by wrapping and tying with thread. Upholstery thread is preferably used for wrapping and tying both the crossbar 8 and the rubber strands 20.

Figure 2:
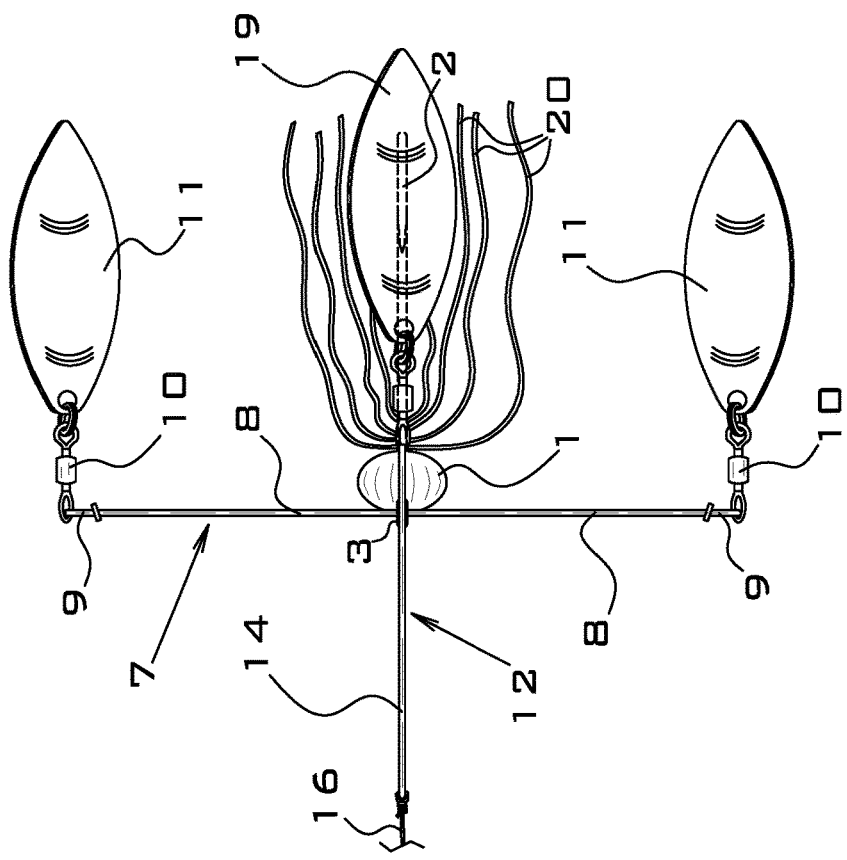
FIG. 2 is a top view of the present invention shown with the spinner blades and rubber strands in an orientation that would be produced when the lure is being pulled though the water during a normal retrieve.

FIG. 2 is a top view of the present invention shown with the spinner blades and rubber strands in an orientation that would be produced when the lure is being pulled though the water during a normal retrieve. As shown, the crossbar 8 of the transverse spinner assembly 7 is oriented perpendicular to the plane formed by the lower and upper legs 13, 14 of the vertical spinner assembly 12, resulting in a symmetrical orientation of the two side spinner blades 11 in relation to the weighted body 1 and the hook 2 (which is shown in phantom). Also as shown, the central spinner blade 19 is positioned vertically in line with the weighted body 1 and the hook 2. This relative positioning of the side spinner blades 11 and central spinner blade 19 causes the lure to "run straight" (i.e., with no erratic side-to-side or up-and-down changes in direction). The football shape of the weighted body 1 is also visible in this view, illustrating that the longitudinal axis of the weighted body 1 is perpendicular to the plane formed by the lower and upper legs 13, 14 and, therefore, also perpendicular to the direction of movement of the lure when it is moving through the water or along the lake bottom. Also as shown, the longitudinal axis of the weighted body 1 is parallel to the longitudinal axis of the crossbar 8.

Figure 3:
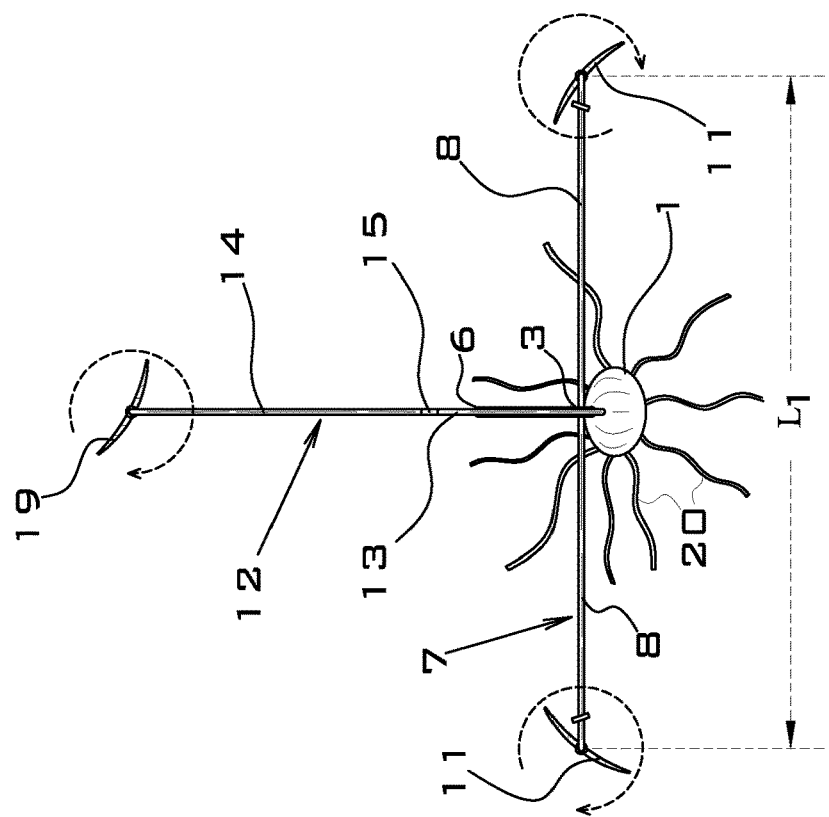
FIG. 3 is a front view of the present invention shown with the spinner blades and rubber strands in an orientation that would be produced when the lure is being pulled though the water during a normal retrieve.

FIG. 3 is a front view of the present invention, shown with the spinner blades and rubber strands in an orientation that would be produced when the lure is being pulled though the water during a normal retrieve. The rotations of the three spinner blades are illustrated by the dashed arrows. As shown, the hook point 6 is positioned vertically above the side spinner blades 11, and the weighted body 1 is positioned vertically below the crossbar 8, which has a length $L_1$. Also shown is the central spinner blade 19, which is positioned directly above the weighted body 1. This view illustrates that the central spinner blade 19 is positioned so as to act as a rudder or "kite tail" to produce drag and thereby keep the lure in an upright orientation when the lure is either being retrieved normally or is free falling through the water.

Figure 4:
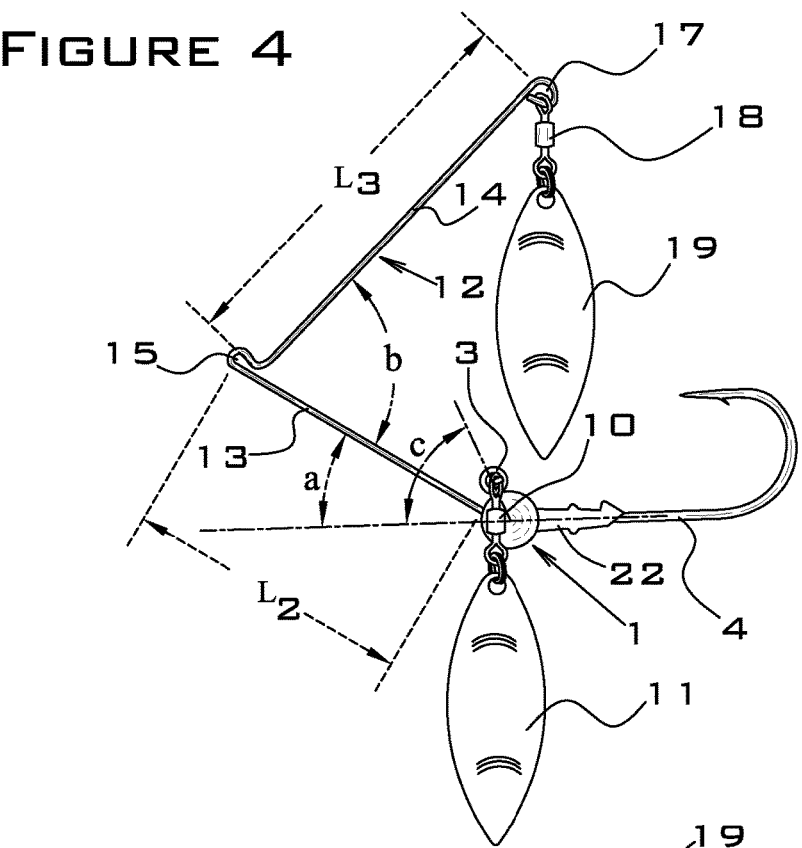
FIG. 4 is a left side view of the present invention shown with the spinner blades oriented as would occur if the lure were suspended in air and with the rubber strands removed for clarity.

FIG. 4 is a left side view of the present invention, shown with the spinner blades oriented as would occur if the lure were suspended in air, with the rubber strands 20 removed for clarity. FIGS. 3 and 4 illustrate the various linear and angular dimensions that are critical in order for the present invention to perform properly. As shown in FIG. 3, $L_1$ is the length of the crossbar 8. As shown in FIG. 4 $L_2$ is the length of the lower leg 13, and $L_3$ is the length of the upper leg 14. The present invention is preferably constructed so that the ratio of $L_2/L_1$ is in the range of 0.4 to 0.5, with an ideal value of 0.45, and the ratio of $L_3/L_2$ is in the range of 1.4 to 1.6, with an ideal ratio of 1.5. Angle "a" is the vertical angle between the hook shank 4 and the lower leg 13. The present invention is preferably constructed so that Angle "a" is in a range of 30° to 34°, with an ideal value of 32°. Angle "b" is the vertical angle between the lower leg 13 and the upper leg 14. The present invention is preferably constructed so that Angle "b" is in a range of 75° to 79°, with an ideal value of 77°. Angle "c" is the angle between the hook eye 3 and the hook shank 4. A hook having an Angle "c" in a range of 65° to 69° is preferred, with a value of 67° being ideal.

Although the present invention may be manufactured in a variety of sizes for different fishing applications, one representative size that is suitable for catching largemouth and smallmouth bass has a weighted body 1 having length along the longitudinal axis of 0.61 inches and a length along the short axis of 0.43 inches, a crossbar 8 having a length $L_1$ of 4.4 inches, a lower leg 13 having a length $L_2$ of 2.0 inches, and an upper leg 14 having a length $L_3$ of 3.0 inches, a hook size of 4/0 or 5/0, maximum lengths of the side spinners 11 and the central spinner 19 of 2.0 inches, and a wire diameter of 0.04 inch for the crossbar 8, the lower leg 13 and the upper leg 14. Also shown in FIG. 3 is a skirt-retaining extension 22 that is a molded-in part of the weighted body 1. The skirt-retaining extension 22 is a conventional feature that extends around the front portion of the shank 4 and helps prevent the rubber strands of the skirt (not shown) from slipping down the shank 4 of the hook when the present invention is pulled through the water.

Figure 5:
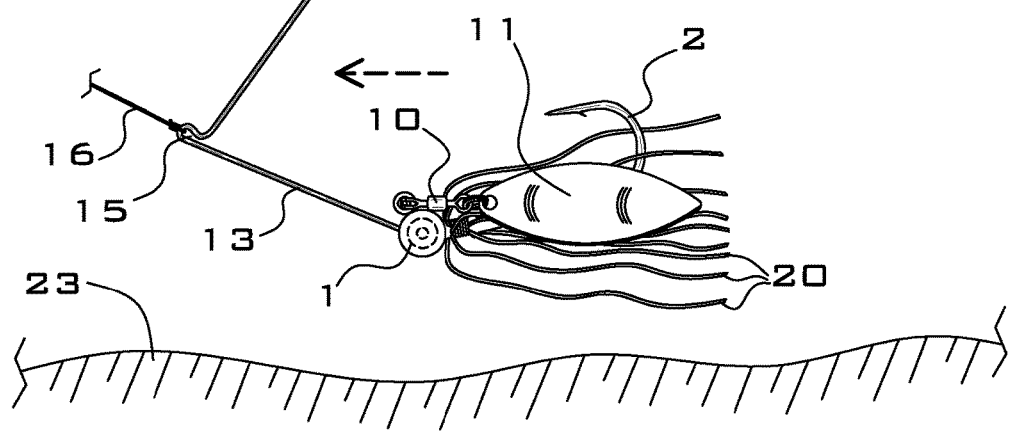
FIG. 5 is a left side view of the present invention shown moving through open water above a lake bottom during a normal retrieve.

FIGS. 5, 6 and 7 illustrate the behavior of the present invention in an open water retrieve, in a free fall, and when being pulled across a lake bottom, respectively. The dashed arrows in these figures illustrate the directions of movement of the present invention under various conditions. FIG. 5 is a left side view of the present invention shown moving through open water above a lake bottom 23 during a normal retrieve. The side spinner blades 11, the central spinner blade 19, and the rubber strands 20 trail horizontally due to water drag, and the hook 2 is centrally positioned point-up between the side spinner blades 11 and below the central spinner blade 19, making the skirted hook 2 the target of choice for an attacking fish and positioning the hook 2 optimally to hook a striking fish.

FIG. 6 is a left side view of the present invention shown free-falling through open water above a lake bottom 23. This condition occurs when a fisherman allows the fishing line 16 to become slack, and the present invention is no longer being pulled through the water. Under this condition, the combination of the downward force produced by the weight of the weighted body 1, the drag produced by the side spinners 11 and the central spinner 19, and the overall balance of the components, cause the present invention to travel in a diagonally downward direction, with the hook maintained in an upright and optimal position for hooking a striking fish. Under certain conditions, fish such as bass are known to be more likely to strike a lure when it is free falling through the water rather than being retrieved. The present invention, which is designed to free-fall with the spinners spinning and the hook in an optimal orientation to hook a striking fish, is therefore superior for catching fish to other spinnerbait lure examples of the prior art that are not expressly designed to operate so as to attract and hook fish when free-falling.

FIG. 7 is a left side view of the present invention shown being pulled across a lake bottom 23. In this condition, the present invention is meant to mimic a pod of baitfish that are feeding on the lake bottom. On order to cause the present invention to travel along a lake bottom, a fisherman must maintain a relatively slow rate of retrieval compared to the speed of a normal retrieval.) The present invention is designed to slide across a lake bottom in a stable and upright position; specifically, the weight of the weighted body 1 pushes both of the two side spinner blades 11 against and slightly into the sediments of the lake bottom 23, causing the side spinner blades 11 to act as outriggers for the hook 2 and maintaining the hook 2 in an upright position with the point 6 above the lake bottom 23, where it is properly positioned to hook a striking fish.

The oblong, football shape of the weighted body 1 minimizes the tendency for overturning of the present invention and therefore is superior for maintaining the hook 2 in an upright position compared to the spherical or streamlined-shape bodies of examples of the prior art. As the side spinner blades 11 and the weighted head 1 are pulled across the lake bottom 23, they stir up mud trails 24, thereby mimicking the effects of a pod of bottom-feeding baitfish. The elongated, football shape of the weighted body 1 causes it to stir up more mud than would be stirred up by a spherical or streamlined-shape body of the same weight. The side spinners 11 intermittently flutter as they drag along the lake bottom 23, while the central spinner blade 19 rotates. This combination of fluttering and rotating motion, in conjunction with the stirring up of bottom sediments, is particularly attractive to predatory fish.

The present invention represents an improvement over the prior art, and its advantages are summarized as follows:

1) The present invention comprises a pair of lateral spinners and a single central spinner, wherein the lateral spinners are connected to the ends of a crossbar and the crossbar is rigidly attached to a weighted body by attaching it to the eye of a hook that is molded into the weighted body, the central spinner is attached to the weighted body via a wire that is molded into the weighted body, and the fishing line is attached to the central wire assembly rather than being attached to the hook eye. With this configuration, the hook eye is used as a rigid attachment point for a spinner assembly but not as a fishing line attachment point, which produces a unique and properly balanced lure.

2) The weighted body is football-shaped, with the longitudinal axis of the weighted body perpendicular to the shank of the hook, thereby stabilizing the lure against overturning when being pulled across a lake bottom (as compared to a spherical or streamlined-shape of body) and also stirring up more bottom sediments than would be stirred up by a spherical shape having the same weight.

3) The hook and the vertical spinner assembly are molded into the weighted body at precise, predefined positions and angular orientations in order to balance the lure.

4) The side spinner blades are positioned vertically slightly lower than the hook, thereby keeping the hook upright and above the lake bottom when the lure is being pulled across the lake bottom.

5) The angles, lengths and weights of the components are selected so that the lure resembles a pod of baitfish when the lure is being retrieved and also when it is free falling or being pulled across the lake bottom.

Although the preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

I claim:

1. A spinnerbait fishing lure comprising:
   (a) an ellipsoidal weighted body having a molded-in hook, wherein the hook comprises an eye that protrudes from a top front part of the weighted body, a shank that extends from a rear of the weighted body, a bend, and a point, and wherein a longitudinal axis of the weighted body is perpendicular to the shank;
   (b) a transverse spinner assembly comprising a horizontal crossbar with a first end, a second end, and a midpoint that passes through and is rigidly attached to the eye, wherein the crossbar is oriented perpendicular to a plane formed by the bend of the hook, wherein a first swivel is connected to the first end of the crossbar, wherein a second swivel is connected to the second end of the crossbar, wherein a first side spinner blade is connected to the first swivel to form a rotatable connection between the first side spinner blade and the first end of the crossbar, and wherein a second side spinner blade is connected to the second swivel to form a rotatable connection between the second side spinner blade and the second end of the crossbar; and
   (c) a V-shaped vertical spinner assembly comprising a lower leg that is molded into and extends from a front of the weighted body, an upper leg, and an attachment loop that is formed into a vertex of a V-shaped bend between the lower leg and the upper leg, wherein the lower and upper legs form a plane, and wherein the crossbar is oriented perpendicular to the plane formed by the lower and upper legs of the vertical spinner assembly.

2. The spinnerbait fishing lure of claim 1, wherein the crossbar has a first end and a second end, and wherein the first and second ends of the crossbar each comprises a loop connector that is formed by bending the end of the crossbar.

3. The spinnerbait fishing lure of claim 1, wherein a plane formed by the lower leg and the upper leg is coplanar with a plane formed by the bend of the hook.

4. The spinnerbait fishing lure of claim 1, wherein an upper end of the upper leg terminates in a loop connector that is formed by bending an end of the upper leg, wherein a third swivel is attached to the loop connector, and wherein a central spinner blade is attached to the swivel to form a rotatable connection between the upper leg and the central spinner blade.

5. The spinnerbait fishing lure of claim 1, wherein the central spinner blade is positioned vertically in line with the weighted body and the hook.

6. The spinnerbait fishing lure of claim 1, wherein the longitudinal axis of the weighted body is perpendicular to the plane formed by the lower and upper legs of the vertical spinner assembly and parallel to a longitudinal axis of the crossbar.

7. The spinnerbait fishing lure of claim 1, wherein the first and second side spinner blades are positioned vertically lower than the hook.

8. The spinnerbait fishing lure of claim 1, wherein the crossbar has a first length, the lower leg has a second length, and the upper leg has a third length, wherein the ratio of the second length to the first length is in the range of 0.4 to 0.5, and wherein the ratio of the third length to the second length is in the range of 1.4 to 1.5.

9. The spinnerbait fishing lure of claim 1, wherein there is a first vertical angle between the hook shank and the lower leg, wherein there is a second vertical angle between the lower leg and the upper leg, wherein there is an angle between the hook eye and the hook shank, wherein the first vertical angle is preferably in the range of 30 to 34 degrees, wherein the second vertical angle is preferably in the range of 75 to 79 degrees, and wherein the angle between the hook eye and the hook shank is in the range of 65 to 69 degrees.

10. The spinnerbait fishing lure of claim 1, further comprising a plurality of flexible rubber strands that are attached to a forward portion of the hook shank to form a skirt around the hook.

* * * * *